United States Patent
Buburuzan

(10) Patent No.: US 10,455,592 B2
(45) Date of Patent: Oct. 22, 2019

(54) METHOD, APPARATUS, AND COMPUTER PROGRAM FOR A MOBILE DEVICE FOR REDUCING INTERFERENCE BETWEEN A FIRST MOBILE COMMUNICATION SYSTEM AND A SECOND MOBILE COMMUNICATION SYSTEM

(71) Applicant: VOLKSWAGEN AG, Wolfsburg (DE)

(72) Inventor: Teodor Buburuzan, Braunschweig (DE)

(73) Assignee: VOLKSWAGEN AG (DE)

( * ) Notice: Subject to any disclaimer, the term of this patent is extended or adjusted under 35 U.S.C. 154(b) by 0 days.

(21) Appl. No.: 15/830,395

(22) Filed: Dec. 4, 2017

(65) Prior Publication Data
US 2018/0176923 A1  Jun. 21, 2018

(30) Foreign Application Priority Data
Dec. 16, 2016 (DE) .......... 10 2016 225 226

(51) Int. Cl.
*H04W 72/08* (2009.01)
*H04W 64/00* (2009.01)
*H04W 16/14* (2009.01)

(52) U.S. Cl.
CPC ......... *H04W 72/082* (2013.01); *H04W 16/14* (2013.01); *H04W 64/003* (2013.01)

(58) Field of Classification Search
CPC .. H04W 16/14; H04W 64/003; H04W 72/082
See application file for complete search history.

(56) References Cited

U.S. PATENT DOCUMENTS

2002/0142779 A1* 10/2002 Goto .............. H04W 72/02
455/450
2007/0021126 A1  1/2007 Nanda et al.
(Continued)

FOREIGN PATENT DOCUMENTS

DE          60203561 T2    3/2006
DE    102006006182 A1    8/2006
(Continued)

OTHER PUBLICATIONS

ETSI; Draft ETSI TS 102 792; Intelligent Transport Systems (ITS); Mitigation techniques to avoid interference between European CEN Dedicated Short Range Communication (CEN DSRC) equipment and Intelligent Transport Systems (ITS) operating in the 5 gHz frequency range; V0.1.8; Sep. 2012.
(Continued)

*Primary Examiner* — Kashif Siddiqui
(74) *Attorney, Agent, or Firm* — Barnes & Thornburg LLP

(57) ABSTRACT

A method, a device, and computer program for a mobile device for reducing interference between a first mobile communication system and a second mobile communication system and a vehicle including the disclosed device. The method for the mobile device receives information about a location of one or more transmitters of the first mobile communication system and information about a used communication resource of the one or more transmitters of the first mobile communication system, determines a position of the mobile device, and adapts the communication of the mobile device via the second mobile communication system for the position of the mobile device based on the information about the location of the one or more transmitters of the first mobile communication system.

31 Claims, 1 Drawing Sheet

(56) References Cited

U.S. PATENT DOCUMENTS

| | | | |
|---|---|---|---|
| 2008/0262722 A1 | 10/2008 | Haag et al. | |
| 2009/0215452 A1 | 8/2009 | Balasubramanian et al. | |
| 2010/0240346 A1 | 9/2010 | Jain et al. | |
| 2013/0003589 A1* | 1/2013 | Gage | H04J 11/005 370/252 |
| 2014/0044095 A1* | 2/2014 | Li | H04W 16/14 370/331 |
| 2014/0094165 A1 | 4/2014 | Karlsson et al. | |
| 2014/0378180 A1* | 12/2014 | Schwent | H04W 52/241 455/522 |
| 2016/0112877 A1* | 4/2016 | Tseng | H04W 12/08 455/414.2 |

FOREIGN PATENT DOCUMENTS

| | | |
|---|---|---|
| DE | 602004002471 T2 | 1/2007 |
| DE | 102009050503 A1 | 11/2010 |
| DE | 102009060358 A1 | 6/2011 |
| DE | 102011115108 A1 | 4/2012 |
| DE | 19983085 B3 | 3/2013 |
| DE | 102011118706 A1 | 5/2013 |
| DE | 102012024869 A1 | 6/2014 |
| DE | 102013204373 A1 | 9/2014 |
| DE | 102013006125 A1 | 10/2014 |
| DE | 102013227144 A1 | 12/2014 |
| DE | 102013211980 A1 | 1/2015 |
| DE | 102015010667 A1 | 3/2016 |
| DE | 102015000403 B3 | 4/2016 |
| DE | 102015117029 A1 | 4/2016 |
| JP | 2002300172 A | 10/2002 |
| JP | 2007165999 A | 6/2007 |
| JP | 2009010946 A | 1/2009 |
| JP | 2014022875 A | 2/2014 |
| JP | 2015177370 A | 10/2015 |
| WO | 2004043088 A2 | 5/2004 |
| WO | 2005125235 A2 | 12/2005 |
| WO | 2008022272 A2 | 2/2008 |
| WO | 2009000295 A1 | 12/2008 |
| WO | 2009002958 A2 | 12/2008 |
| WO | 2009071967 A1 | 6/2009 |
| WO | WO-2015078325 A1 * | 6/2015 ........ H04W 72/1215 |
| WO | 2013168197 A1 | 12/2015 |

OTHER PUBLICATIONS

Office Action for Japanese Patent Application No. 2017-239843; dated Nov. 26, 2018.

* cited by examiner

METHOD, APPARATUS, AND COMPUTER PROGRAM FOR A MOBILE DEVICE FOR REDUCING INTERFERENCE BETWEEN A FIRST MOBILE COMMUNICATION SYSTEM AND A SECOND MOBILE COMMUNICATION SYSTEM

PRIORITY CLAIM

This patent application claims priority to German Patent Application No. 10 2016 225 226.7, filed 16 Dec. 2016, the disclosure of which is incorporated herein by reference in its entirety.

SUMMARY

Illustrative embodiments relate to a method, a device and a computer program for a mobile device for reducing interference between a first mobile communication system and a second mobile communication system, and to a vehicle and a programmable mobile phone containing the device.

BRIEF DESCRIPTION OF THE DRAWINGS

Disclosed embodiments are described in greater detail below with reference to the drawings, in which.

DETAILED DESCRIPTION

Figure 1:
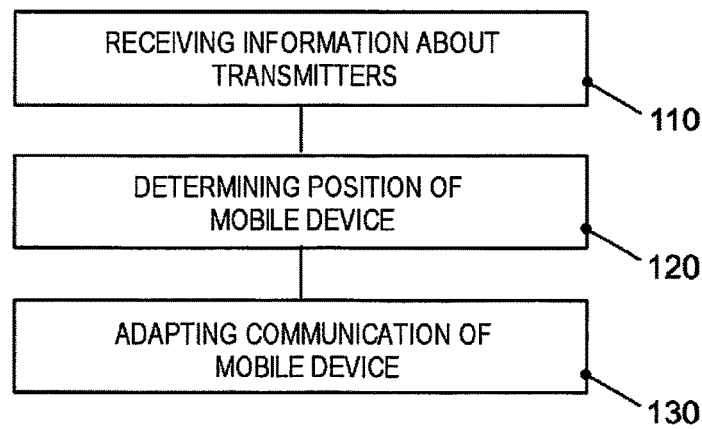
FIG. 1 shows a flow diagram of a method for a mobile device for reducing interference between a first mobile communication system and communication of the mobile device via a second mobile communication system.

An area of focus for the automotive engineering sector is the networking of vehicles to other vehicles, to a computer center of a vehicle manufacturer or to the Internet. The mobility of the vehicle may make it harder for the vehicle to communicate with other communication partners, for instance, as a result of shadowing, reflections, interference or a change in distance from the communications partners. The same problems are often also faced by mobile device carried in vehicles, for instance, in local public transport.

A plurality of services that use the networking of a mobile device to the Internet may be instructed to reload and buffer data continuously, for instance, in a navigation application or when playing back media data. If, in this case, a restriction on communication by the mobile device arises, then media playback or reloading map data may be restricted. In addition, reliability of vehicle-to-vehicle communication can depend on receiver vehicles being able to decode sent messages successfully.

There is a need for an improved concept for data transmission by mobile devices to increase reliability and reduce mutual interference.

The independent claims address this need.

At least some exemplary embodiments are based on determining a position of a mobile device, and determining, on the basis of information about a location of one or more transmitters of a first mobile communication system, a location of transmitters of the first mobile communication system in the vicinity of the mobile device. If for communication via a second mobile communication system, which is different from the first mobile communication system, the mobile device uses identical or similar communication resources (for example, frequency resources) to the first mobile communication system, then the communication of the mobile device can be adapted such that usage of the same resources is reduced or avoided or such that a more robust communication is selected, for instance, to improve reliability of the data transmission via the second mobile communication system and to reduce mutual interference.

Exemplary embodiments provide a method for a mobile device for reducing interference between a first mobile communication system and communication of the mobile device via a second mobile communication system. The method comprises receiving information about a location of one or more transmitters of the first mobile communication system and information about a used communication resource of the one or more transmitters of the first mobile communication system. The method also comprises determining a position of the mobile device. The method further comprises adapting the communication of the mobile device via the second mobile communication system for the position of the mobile device on the basis of the information about the location of the one or more transmitters of the first mobile communication system by adapting a usage of a communication resource of the second mobile communication system on the basis of the information about the used communication resource of the one or more transmitters of the first mobile communication system.

Adapting the usage of the communication resource can facilitate, for example, a shift for the communication via the second mobile communication system to communication resources that are not being used at this position by the first mobile communication system, or a change to a modulation or an increase in the transmit power to afford more robust transmission. This can increase the communication reliability, for instance, and reduce interference in the communication.

For instance, the used communication resource and/or the communication resource of the second mobile communication system can comprise at least one element from the group comprising frequency resource, time resource and spatial resource. Adapting the communication on the basis of frequency, time and spatial resources can facilitate more efficient simultaneous usage of the resources.

For example, adapting the usage of the communication resource can comprise changing the used communication resource. For instance, a different frequency, time or spatial resource can be used.

Alternatively, adapting the usage of the communication resource can comprise keeping the communication resource using modified communication parameters. For instance, in this case, a transmit power can be increased or a digital modulation or coding can be modified.

For example, the used communication resource can comprise a first frequency resource, and the communication resource of the second mobile communication system can comprise a second frequency resource. There can be at least a partial overlap between the first frequency resource and the second frequency resource, or a frequency spacing between the first frequency resource and the second frequency resource can be less than a frequency spacing threshold value. Adapting the communication can comprise, for example, using for the communication via the second mobile communication system a frequency resource that at the position of the mobile device is not used by the one or more transmitters of the first mobile communication system. If two mobile communication systems communicate in adjacent or identical frequency ranges, adapting the communication in the second mobile communication system can prevent interference and increase the communication reliability.

Alternatively or additionally, adapting the communication can comprise adapting a time of the communication. For example, adapting the time of the communication can comprise advancing or delaying a communication, adapting a repetition rate of the communication and/or increasing a data transfer rate of the communication. Adapting a time of the communication, for instance, to wait until a transmitter of the first mobile communication system has passed by or to complete the communication earlier, can increase the communication reliability.

Adapting the communication can also comprise, for example, adapting a handover of the mobile device between base stations of the second mobile communication system. Hence interference in the communication via the second mobile communication system can be reduced, for instance, by using other frequency and spatial resources.

Adapting the communication can additionally comprise, for example, adapting a digital modulation of the communication of the mobile device via the second mobile communication system. For instance, adapting the digital modulation of the communication of the mobile device via the second mobile communication system can use a digital modulation having more robust properties (for instance, fewer different phase or amplitude states) if a location of a transmitter of the one or more transmitters of the first mobile communication system is situated in a vicinity of the position of the mobile device.

Additionally or alternatively, adapting the communication can also comprise increasing a transmit power of the mobile device for the communication of the mobile device via the second mobile communication system. Increasing the transmit power can increase reliability of the communication via the second mobile communication system.

A frequency resource of the used communication resource and/or a frequency resource of the communication resource of the second mobile communication system may lie at least in part in a frequency range between 5 GHz and 6 GHz, for example. Frequency bands of mobile communication systems based on standards IEEE 802.11ac and IEEE 802.11p from the Institute of Electrical and Electronics Engineers (IEEE), for instance, can overlap or be adjacent to one another in this frequency range.

The information about the location of the one or more transmitters of the first mobile communication system and the information about the used communication resource can be contained in a map, for example. Receiving the information about the location of the one or more transmitters of the first mobile communication system and the information about the used communication resource can comprise receiving at least part of the map. A navigation map of a navigation application can contain the map, for instance.

Adapting the communication can be based, for example, on at least one element from the group comprising frequency multiplexing techniques, time multiplexing techniques and spatial multiplexing techniques. For instance, adapting the communication can comprise using one of the multiplexing techniques to avoid or reduce multiple usage of frequency resources at the same time and in the same place.

Exemplary embodiments also provide a program comprising a program code for performing the method when the program code is executed on a computer, in a processor, in a control module or in a programmable hardware component.

Exemplary embodiments also provide a device for a mobile device for reducing interference between a first mobile communication system and communication of the mobile device via a second mobile communication system. The device comprises at least one interface designed to receive information about a location of one or more transmitters of the first mobile communication system and information about a used communication resource of the one or more transmitters of the first mobile communication system. The at least one interface is additionally designed to receive information about a position of the mobile device from a positioning module. For example, the device can also comprise the positioning module. The device also comprises a control module designed to control the at least one interface. In addition, the control module is designed to determine a position of the mobile device on the basis of the information about the position of the mobile device. Moreover, the control module is designed to adapt communication of the mobile device via the second mobile communication system for the position of the mobile device on the basis of the information about the location of the one or more transmitters of the first mobile communication system by adapting a usage of a communication resource of the second mobile communication system on the basis of the information about the used communication resource of the one or more transmitters of the first mobile communication system.

Exemplary embodiments also provide the mobile device comprising the device for the mobile device. For example, the mobile device may correspond to a vehicle, a programmable mobile phone or a tablet computer. Exemplary embodiments also provide a vehicle comprising the device for the mobile device for adapting communication of the vehicle via the second mobile communication system.

Various exemplary embodiments are now described in more detail with reference to the accompanying drawings, which show some exemplary embodiments. For the sake of clarity, the thicknesses of lines, layers and/or regions may be shown exaggerated in the figures.

In the description below of the accompanying figures, which show just some exemplary embodiments by way of example, the same reference numbers may denote identical or similar components. In addition, collective reference numbers can be used for components and objects that appear more than once in an exemplary embodiment or in a drawing but are described jointly in terms of one or more features. Components or objects denoted by the same or collective reference numbers may be identical in design but may also differ in design with regard to one or more features or all the features, for instance, with regard to their dimensions, unless explicitly stated or implied otherwise in the description.

Although exemplary embodiments can be modified and altered in various ways, exemplary embodiments are shown in the figures by way of example and are described in detail in this document. It should be made clear, however, that the intention is not to limit exemplary embodiments to the forms disclosed in each case but instead the exemplary embodiments are intended to cover all the functional and/or structural modifications, equivalents and alternatives within the scope of the disclosure. The same reference numbers are used throughout the description of the figures to donate identical or similar elements.

It should be noted that an element described as "connected" or "coupled" to another element may be connected or coupled directly to the other element or there may be elements interposed therebetween. If, however, an element is described as "directly connected" or "directly coupled" to another element then there are no elements interposed therebetween. Other terms used to describe the relationship between elements should be interpreted similarly (e.g., "between" as opposed to "directly therebetween", "adjacent" as opposed to "directly adjacent", etc.).

The terminology used in this document serves only to describe certain exemplary embodiments and is not intended to restrict the exemplary embodiments. The use in this document of singular forms is intended to include also the plural forms, provided the context does not clearly indicate otherwise. It should also be made clear that expressions such as, e.g., "contains", "containing", "has", "having", "comprises" and/or "comprising" as used in this document indicate the presence of specified features, whole numbers, operations, procedures, elements and/or components but does not exclude the existence or addition of one or more features, whole numbers, operations, procedures, elements, components and/or groups thereof.

Unless otherwise specified, all the terms used in this document (including technical and scientific terms) have the same meaning as a typical person skilled in the art in the field of the exemplary embodiments attaches to these terms. It should also be made clear that expressions, for instance, expressions defined in general-usage dictionaries, are to be interpreted as though having the meaning consistent with their meaning in the context of the relevant technology, and not interpreted in an idealized or overly technical sense unless expressly specified otherwise in this document.

Figure 2:
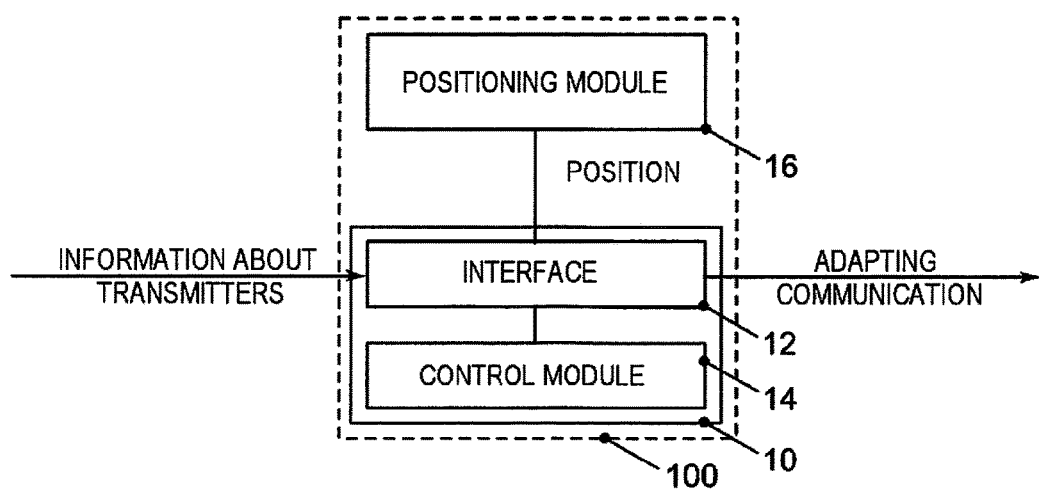
FIG. 2 shows a block diagram of a device for a mobile device for reducing interference between a first mobile communication system and communication of the mobile device via a second mobile communication system.

FIG. 1 shows a flow diagram of a method for a mobile device 100 for reducing interference between a first mobile communication system and communication of the mobile device 100 via a second mobile communication system. FIG. 2 shows a block diagram of a corresponding device 10 for the mobile device, designed to perform the method.

For example, the mobile device may correspond to a programmable mobile phone, a tablet computer or a vehicle. Reducing the interference can comprise, for example, avoiding or reducing first signals from the first mobile communication system and second signals from the second mobile communication system, for instance, by avoiding or reducing usage of the same frequency, time or spatial resources in a coverage area of transmitters of the first mobile communication system.

The method comprises receiving 110 information about a location of one or more transmitters of the first mobile communication system and information about a used communication resource of the one or more transmitters of the first mobile communication system.

Receiving 110 the information about a location of the one or more transmitters of the first mobile communication system and/or the information about the used communication resource of the one or more transmitters of the first mobile communication system can comprise, for example, receiving the information via a mobile communication system, for instance, the first or the second mobile communication system. Alternatively or additionally, receiving 110 the information about a location of the one or more transmitters of the first mobile communication system and/or the information about the used communication resource of the one or more transmitters of the first mobile communication system can comprise reading out the information from a memory of the mobile device.

The information about the location of the one or more transmitters of the first mobile communication system and the information about the used communication resource can be contained in a map, for example. Receiving the information about the location of the one or more transmitters of the first mobile communication system and the information about the used communication resource can comprise, for example, receiving (or reading out) at least part of the map. Alternatively or additionally, the information about a location of the one or more transmitters of the first mobile communication system and/or the information about the used communication resource of the one or more transmitters of the first mobile communication system can be contained in a data structure, for instance, in a database or a list structure. Receiving the information about the location of the one or more transmitters of the first mobile communication system and the information about the used communication resource can comprise, for example, receiving or reading out at least part of the data structure.

The method also comprises determining 120 a position of the mobile device. Determining 120 the position of the mobile device can be based, for example, on a satellite-based navigation system, for instance, a Global Positional System (GPS), a Global Navigation Satellite System (GLONASS) or a Galileo Navigation Satellite System. Alternatively or additionally, determining 120 the position of the mobile device can be based on triangulation of received radio signals.

The method further comprises adapting 130 the communication of the mobile device via the second mobile communication system for the position of the mobile device on the basis of the information about the location of the one or more transmitters of the first mobile communication system by adapting a usage of a communication resource of the second mobile communication system on the basis of the information about the used communication resource of the one or more transmitters of the first mobile communication system. For example, the communication via the second mobile communication system can correspond to data communication or data transmission. For example, the communication via the second mobile communication system can correspond to vehicle-to-vehicle communication or vehicle-to-infrastructure communication, for instance, communication by cyclical status messages and/or communication by event-based messages.

For instance, the used communication resource and/or the communication resource of the second mobile communication system can comprise at least one element from the group comprising frequency resource, time resource and spatial resource.

For example, adapting the usage of the communication resource can comprise changing the used communication resource. For instance, a different frequency, time or spatial resource can be used. Alternatively, adapting the usage of the communication resource can comprise keeping the communication resource using modified communication parameters. For instance, in this case, a transmit power can be increased or a digital modulation or coding can be modified.

For example, the used communication resource can comprise a first frequency resource (for instance, a frequency range/frequency band of carrier frequencies of at least part of the first mobile communication system), and the communication resource of the second mobile communication system can comprise a second frequency resource (for instance, a frequency range/frequency band of carrier frequencies of at least part of the second mobile communication system). There can be at least a partial overlap between the first frequency resource and the second frequency resource. Alternatively or additionally, a frequency spacing between the first frequency resource and the second frequency resource can be less than a frequency spacing threshold value. A frequency resource of the used communication resource and/or a frequency resource of the communication resource of the second mobile communication system can lie at least in part in a frequency range between 5 GHz and 6 GHz, for example. For example, the first mobile communication system can correspond to a WLAN (Wireless Local Area Network) (for instance, in accordance with IEEE standard 802.11ac or 802.11ad). For example, the second mobile communication system can correspond to a vehicle-to-vehicle communication system in accordance with IEEE standard 802.11p.

Alternatively, a frequency resource of the used communication resource and/or a frequency resource of the communication resource of the second mobile communication system can lie at least in part in a frequency range between 2 GHz and 3 GHz, for instance, in a frequency band positioned about 2.4 GHz. The first mobile communication system may correspond to a WLAN, for instance, and the second mobile communication system may correspond to a BLUETOOTH® mobile communication system.

Adapting 130 the communication (for instance, adapting the usage of the communication resource) can comprise, for example, using for the communication via the second mobile communication system a frequency resource that at the position of the mobile device is not used by the one or more transmitters of the first mobile communication system. Adapting 130 the communication (for instance, adapting the usage of the communication resource) can comprise, for example, using a frequency resource for which a signal strength of the first mobile communication system at the position of the mobile device is lower than in other frequency resources used both by the first mobile communication system and by the second mobile communication system. The adapting 130 (for instance adapting the usage of the communication resource) can adapt the communication via the second mobile communication system such that (solely) frequency resources are used that at the position of the mobile device are not used by the one or more transmitters of the first mobile communication system.

Additionally or alternatively, adapting 130 the communication (for instance, adapting the usage of the communication resource) can also comprise increasing a transmit power of the mobile device for the communication of the mobile device via the second mobile communication system. Adapting 130 the communication can comprise, for example, increasing the transmit power of the mobile device for frequency resources that at the position of the mobile device are used by the first mobile communication system and the second mobile communication system.

Adapting 130 the communication (for instance, adapting the usage of the communication resource) can also comprise, for example, adapting a digital modulation (or a channel coding) of the communication of the mobile device via the second mobile communication system. For example, adapting 130 the communication (for instance, adapting the usage of the communication resource) can comprise selecting a first digital modulation, which uses a larger number of (phase or amplitude) states, if there is no transmitter of the first mobile communication system in a vicinity of the position of the mobile device 100, and selecting a second digital modulation, which uses a smaller number of states, if there is a transmitter of the first mobile communication system in the vicinity of the position of the mobile device 100 (for instance, if there is at least a partial overlap between the first frequency resource and the second frequency resource).

In at least some exemplary embodiments, adapting 130 the communication (for instance, adapting the usage of the communication resource) can comprise adapting a time of the communication. For example, adapting the time of the communication can comprise advancing or delaying a communication, adapting a repetition rate of the communication and/or increasing a data transfer rate of the communication. Adapting 130 the communication (for instance, adapting the usage of the communication resource) can comprise, for example, advancing the time of the communication to complete the communication via the second mobile communication system before the mobile device reaches a vicinity of a transmitter of the first mobile communication system. Alternatively or additionally, adapting 130 the communication (for instance, adapting the usage of the communication resource) can comprise delaying the time of the communication to exclude the communication via the second mobile communication system after the mobile device leaves a vicinity of a transmitter of the first mobile communication system.

Alternatively or additionally, adapting the repetition rate can comprise increasing the repetition rate if the mobile device approaches a position of a transmitter of the first mobile communication system or the mobile device is located in a vicinity of a transmitter of the first mobile communication system. The repetition rate can equal, for example, a repetition rate of cyclically transmitted messages, for instance, of vehicle-to-vehicle messages. Alternatively or additionally, the repetition rate can equal a repetition rate of a redundancy mechanism of a packet-based transmission protocol (for instance, the Transmission Control Protocol, TCP). Alternatively or additionally, adapting 130 the communication can comprise adapting a transmission of redundancy information. Alternatively or additionally, adapting 130 the communication (for instance, adapting the usage of the communication resource) can comprise increasing an amount of data in the redundancy information relative to an amount of data in payload data of the communication via the second mobile communication system if the mobile device approaches a position of a transmitter of the first mobile communication system or the mobile device is located in a vicinity of a transmitter of the first mobile communication system.

For example, increasing the data transfer rate can be performed before the mobile device reaches a vicinity of a transmitter of the first mobile communication system. Increasing the data transfer rate can comprise, for example, buffering media and/or navigation data, for instance, based on an expected expansion of a restriction on the communication via the second mobile communication system.

Adapting 130 the communication (for instance, adapting the usage of the communication resource) can also comprise, for example, adapting a handover of the mobile device between base stations of the second mobile communication system. For example, adapting the handover of the mobile device can comprise handing over the mobile device to a base station of the second mobile communication system, which base station uses frequency resources that are not used by transmitters of the first mobile communication system. Alternatively or additionally, adapting the handover of the mobile device can comprise handing over the mobile device to a base station of the second mobile communication system, which base station uses other spatial resources than the transmitters of the first mobile communication system. For example, the handover to a base station can be made to a base station that lies outside a coverage area of the transmitters of the first mobile communication system or is positioned such that signals between the mobile device and the base station experience less interference from the transmitters of the first mobile communication system.

Adapting 130 the communication (for instance, adapting the usage of the communication resource) can be based, for example, on at least one element from the group comprising frequency multiplexing techniques, time multiplexing techniques and spatial multiplexing techniques. For example, adapting 130 the communication can adapt the communication of the mobile device via the second mobile communication system such that frequency, time and/or spatial resources are used that are not used at the position of the mobile device by the transmitters of the first mobile communication system. For example, the adapting 130 can adapt the communication that uses a spatial multiplexing technique such that signals from the transmitters of the first mobile communication system have no impact or less impact on a direction of propagation/propagation channel of signals between the mobile device and the second mobile communication system.

FIG. 2 shows a block diagram of the device 10 for the mobile device 100 for reducing interference between the first mobile communication system and the communication of the mobile device 100 via the second mobile communication system. The device 10 comprises at least one interface 12 designed to receive information about a location of one or more transmitters of the first mobile communication system and information about a used communication resource of the one or more transmitters of the first mobile communication system. The at least one interface 12 is also designed to receive information about a position of the mobile device from a positioning module 16.

The device 10 also comprises a control module 14 designed to perform the method introduced in connection with FIG. 1. The control module 14 is designed, for example, to control the at least one interface (and possibly the positioning module 16 and/or at least one transceiver). In addition, the control module 14 is designed to determine a position of the mobile device on the basis of the information about the position of the mobile device. Moreover, the control module 14 is designed to adapt communication of the mobile device via the second mobile communication system for the position of the mobile device on the basis of the information about the location of the one or more transmitters of the first mobile communication system by adapting a usage of a communication resource of the second mobile communication system on the basis of the information about the used communication resource of the one or more transmitters of the first mobile communication system.

The device 10 can also comprise, for example, at least one transceiver designed for communication via the first mobile communication system and via the second mobile communication system. The control module 14 can be designed to control the at least one transceiver to adapt the communication via the second mobile communication system. The transceiver can be designed, for example, to communicate via a shared communication channel (also known as a broadcast channel). In some exemplary embodiments, vehicle-to-vehicle communication of the vehicle-to-vehicle interface can correspond either to a direct wireless communication connection between two vehicles, for instance, without employing a base station, for example, in accordance with IEEE 802.11p (a standard from the Institute of Electrical and Electronics Engineers) or to an indirect communication connection (e.g., by a base station). The vehicle-to-vehicle interface 20 can be designed, for example, to communicate wireless directly with other vehicles in a surrounding area. The transceiver can be designed, for example, to communicate via at least one mobile wireless communication system from the group comprising Global System for Mobile telecommunications (GSM), General Packet Radio Service (GPRS), Enhanced Data rates for GSM Evolution (EDGE), Universal Mobile Telecommunication System (UMTS), Long Term Evolution and a 5th generation mobile wireless communication system (5G).

For example, the at least one interface 12 can correspond to one or more inputs and/or one or more outputs for receiving and/or transmitting information, for instance, in digital bit values, on the basis of a code, within a module, between modules or between modules of different entities.

In exemplary embodiments, the control module 14 can correspond to any controller or processor or to a programmable hardware component. For example, the control module 14 can also be implemented as software that is programmed for a corresponding hardware component. The control module 14 can hence be implemented as programmable hardware comprising suitably adapted software. It is possible to use any processors, for instance, digital signal processors (DSPs), in this case.

Exemplary embodiments are not confined to a specific type of processor here. Any processors or even a plurality of processors are possible for implementing the control module 14.

In exemplary embodiments, the positioning module 16 can be implemented as any component that allows information about a position of the device or of the positioning module 16 to be obtained or determined. Possible examples are receivers for satellite-based navigation systems, e.g., a GPS receiver (Global Positioning System receiver), or also other components that allow a position to be determined, for instance, by triangulation of received radio signals.

In at least some exemplary embodiments, the vehicle 100 could correspond to a land vehicle, a water-based vessel, an aircraft, a rail vehicle, a road vehicle, an automobile, an off-road vehicle, a motor vehicle or a heavy goods vehicle.

The control module 14 is coupled to the at least one interface 12. The positioning module 16 is coupled to the at least one interface 12. Exemplary embodiments also provide the mobile device 100, for instance, a programmable mobile phone (also known as a smartphone) or a vehicle, comprising the device 10. FIG. 2 also shows the mobile device comprising the device 10 for the mobile device.

For example, the first mobile communication system and/or the second mobile communication system can correspond to a mobile wireless communication system from the group comprising Global System for Mobile telecommunications (GSM), General Packet Radio Service (GPRS), Enhanced Data rates for GSM Evolution (EDGE), Universal Mobile Telecommunication System (UMTS), Long Term Evolution and a 5th generation mobile wireless communication system (5G).

At least some exemplary embodiments provide using geo-based databases to adapt transmit characteristics. At least some exemplary embodiments are based on the fact that situations exist in which transmitters could make better use of the available radio spectrum, for instance, taking into account information from a geographical map/list/Cloud service (also known as a connectivity map).

We can take as an example a data communication channel having an access point based on standard WLAN/IEEE802.11ac (Wireless Local Area Network) from the Institute of Electrical and Electronics Engineers. Such access points are fixed units (having a clear, invariable geo-position) that in future will transmit in adjacent frequency spectrum positioned about 5.X GHz. Hence mobile units (such as automobiles or smartphones) that communicate with other mobile units at 5.9 GHz (for instance, in accordance with IEEE standard 802.11p) may use a frequency spectrum adjacent to a frequency spectrum that will be used in future by WLAN/IEEE802.11ac access points for their services. If the coordinates of these WLAN/IEEE802.11ac access points are known and are stored (and constantly updated), for instance, in a connectivity map, and made available to the mobile unit, these mobile units can adapt their transmit characteristics of the 5.9 GHz communication and, e.g., use other modulation techniques or use only the upper channels of the 5.9 GHz spectrum, which are affected less severely by WLAN/IEEE802.11ac.

At least some exemplary embodiments can have a positive effect on adapting the transmit characteristics of a mobile unit. If a mobile device knows some fixed transmitters and their transmit characteristics then the mobile device can be designed to adapt the communication via a second mobile communication system. For example, a type of "connectivity map" can be provided (a type of matrix in which the coordinates of a plurality of transmitters and/or of all the transmitters are stored), and the mobile device can be designed to improve adaptation of the communication according to a used mobile communication system. Thus, for instance, ongoing services can be adapted pro-actively to future interference. The mobile device can be designed, for example, to schedule a data download (substantially) earlier if the mobile device knows, for instance, from a connectivity map and a current route of the mobile device, that connectivity will be lost in future (because an external service will interfere with the communication or the present frequency will not be available much longer for communication). Alternatively or additionally, for this purpose the mobile device can be designed to schedule more precisely, for instance, or perform a handover (to another communications service, access point, base station, . . . ) when there is enough time before an interruption. For instance, it is also possible to schedule in a positive direction if it is known, for instance from the connectivity map, that the mobile device will enter within a known distance (for instance, within 2 kilometers) a coverage area of another, possibly better/more favorable/more reliable communication service (e.g., WLAN). Hence the mobile device can be designed to schedule a data download (for instance a software update or media download) for this route segment and not to start the download immediately (e.g., via 3G (third generation mobile communication)).

There are various multiplexing techniques in digital communication, for instance, frequency multiplexing and time multiplexing techniques (TDMA, FDMA, FTDMA, . . . ). In addition, a position-based multiplexing technique is possible. For example, a mobile device can be designed to use known position data from fixed transmitters to reuse frequency and/or time resources and, for instance, to improve other, secondary or tertiary, services by making better use of the frequency/time resources (for instance, (only) where another service is actually active and not everywhere).

For example, the mobile units (mobile devices) can have access to a list that are listed (or includes) (all) the fixed communication units (transmitters) together with their transmit characteristics. A list might look like this, for example:
    Station1: (Latitude1, Longitutde1, Altitude1, frequency spectrum, modulation, transmit power, . . . )
    Station2: (Latitude2, Longitude2, Altitude2, frequency spectrum, modulation, transmit power, . . . ))
    . . .
    StationN: (LatitudeN, LongitudeN, AltitudeN, frequency spectrum, modulation, transmit power, . . . ))

The list can constitute, for example, an exemplary embodiment of the information about the location of the one or more transmitters of the first mobile communication system and the information about the used communication resource.

A similar solution could also be used for all the frequency bands, including all the connectivity services, where an additional detector in hardware might be necessary. Such a list might be cheaper to implement than additional hardware for another frequency band.

Another exemplary embodiment is a computer program for performing at least one of the methods described above when the computer program runs on a computer, a processor or a programmable hardware component. Another exemplary embodiment is also a digital storage medium that is machine-readable or computer-readable and that comprises electronically readable control signals which can interact with a programmable hardware component such that one of the methods described above is performed.

The features disclosed in the above description, in the following claims and in the accompanying figures may be relevant, and can be implemented, both individually and in any combination for realizing an exemplary embodiment in its various forms.

Although some embodiments have been described in connection with a device, these disclosed embodiments obviously also constitute a description of the corresponding method, and therefore a block or a component of a device can also be understood in the sense of a corresponding method operation or a feature of a method operation. Likewise, embodiments that have been described in connection with a method operation or as a method operation also constitute a description of a corresponding block or detail or feature of a corresponding device.

Depending on certain implementation requirements, exemplary embodiments can be implemented in hardware or in software. The implementation can be carried out using a digital storage medium, for instance, a floppy disk, a DVD, a BluRay disc, a CD, a ROM, a PROM, an EPROM, an EEPROM or a FLASH memory, a hard disk or another magnetic or optical storage device, on which are stored electronically readable control signals which interact, or can interact, with a programmable hardware component such that the relevant method is performed.

A programmable hardware component can be formed by a processor, a central processing unit (CPU), a graphics processing unit (GPU), a computer, a computer system, an application-specific integrated circuit (ASIC), an integrated circuit (IC), a system on chip (SOC), a programmable logic element or a field programmable gate array (FPGA).

The digital storage medium can hence be machine-readable or computer-readable. Some exemplary embodiments thus comprise a data storage medium comprising electronically readable control signals that are capable of interacting with a programmable computer system or a programmable hardware component in such a way that one of the methods described in this document is performed. An exemplary embodiment is therefore a data storage medium (or a digital storage medium or a computer-readable medium) having recorded thereon the program for performing one of the methods described in this document.

In general, exemplary embodiments can be implemented as software, firmware, a computer program or a computer program product containing a program code or as data, which program code or data has the effect of implementing one of the methods when the program is executed on a processor or on a programmable hardware component. The program code or the data can be stored on a machine-readable medium or data storage medium, for example. The program code or the data can exist inter alia as source code, machine code or bytecode or any other intermediate code.

In addition, another exemplary embodiment is a data stream, a signal train or a sequence of signals that constitute(s) the program for performing one of the methods described in this document. The data stream, the signal train or the sequence of signals can be configured, for example, so as to be transferred via a data communication connection, for instance, via the Internet or another network. Hence signal trains that represent data constituting the program and that are suitable for transmission via a network or a data communication connection are also exemplary embodiments.

According to at least one exemplary embodiment, during its execution a program can implement one of the methods, for instance by reading memory locations or writing one or more items of data to the memory locations, thereby, if applicable, causing switching operations or other operations in transistor structures, in amplifier structures or in other electrical, optical or magnetic components or components working on the basis of another operating principle. Hence a program can acquire, determine or measure data, values, sensor values or other information by reading a memory location. Thus a program can acquire, determine or measure parameters, values, measured values and other information by reading one or more memory locations, and can produce, cause or perform an action and control other devices, machines and components by writing to one or more memory locations.

The exemplary embodiments described above merely illustrate the principles of the present disclosure. Of course modifications and variations to the arrangements and details described here will be obvious to other persons skilled in the art. Thus the intention is that the disclosure should be limited by the scope of protection of the following claims and not by the specific details that have been presented in this document by the description and explanation of the exemplary embodiments.

LIST OF REFERENCES 10 device for a mobile device
12 at least one interface
14 control module
16 positioning module
100 mobile device
110 receiving information about location and used communication resource of one or more transmitters of a first mobile communication system
120 determining a position of the mobile device
130 adapting communication via a second mobile communication system

The invention claimed is:

1. A method for a mobile device adapting communication by the mobile device to reduce interference between communication of the mobile device via a first mobile communication system and communication of the mobile device via a second mobile communication system, the method comprising:
the mobile device receiving information about a location of one or more transmitters of the first mobile communication system and information about a used communication resource of one or more transmitters of the first mobile communication system;
the mobile device determining a position of the mobile device based on the information about the location of the one or more transmitters of the first mobile communication system; and
the mobile device adapting the communication of the mobile device via the second mobile communication system based on the determined position of the mobile device based on the information about the location of the one or more transmitters of the first mobile communication system by adapting a usage of a communication resource of the second mobile communication system based on the information about the used communication resource of the one or more transmitters of the first mobile communication system.

2. The mobile device communication adaption method of claim 1, wherein the used communication resource the first mobile communication system and/or the communication resource of the second mobile communication system comprises at least one element from the group comprising frequency resource, time resource and spatial resource.

3. The mobile device communication adaption method of claim 1, wherein the mobile device adapting the usage of the communication resource of the second mobile communication system comprises changing, by the mobile device, usage of the communication resource of the second mobile communication system, or maintaining usage, by the mobile device, of the communication resource of the second mobile communication system using modified communication parameters.

4. The mobile device communication adaption method of claim 1, wherein the used communication resource of the first mobile communication system comprises a first frequency resource, and the communication resource of the second mobile communication system comprises a second frequency resource,
wherein there is at least a partial overlap between the first frequency resource and the second frequency resource, or
a frequency spacing between the first frequency resource and the second frequency resource is less than a frequency spacing threshold value.

5. The mobile device communication adaption method of claim 1, wherein the mobile device adapting the communication via the second mobile communication system comprises using, for the communication via the second mobile communication system, a frequency resource that, at the determined position of the mobile device, is not used by the one or more transmitters of the first mobile communication system.

6. The mobile device communication adaption method of claim 1, wherein the adapting the communication additionally comprises adapting a digital modulation of the communication of the mobile device via the second mobile communication system or increasing a transmit power of the mobile device for the communication of the mobile device via the second mobile communication system.

7. The mobile device communication adaption method of claim 1, wherein a frequency resource of the used communication resource of the first mobile communication system and/or a frequency resource of the communication resource of the second mobile communication system lies at least partially in a frequency range between 5 GHz and 6 GHz, and/or
wherein adapting the communication by the mobile device also comprises adapting a handover of the mobile device between base stations of the second mobile communication system.

8. The mobile device communication adaptation method of claim 1, wherein the information about the location of the one or more transmitters of the first mobile communication system and the information about the used communication resource is contained in a map, and wherein receiving the information about the location of the one or more transmitters of the first mobile communication system and the information about the used communication resource comprises receiving at least part of the map.

9. The mobile device communication adaptation method of claim 1, wherein adapting the communication is based on at least one element from the group comprising frequency multiplexing techniques, time multiplexing techniques and spatial multiplexing techniques.

10. The mobile device communication adaption method of claim 1, wherein the mobile device adapting the communication via the second communication system comprises adapting a time of the communication by the mobile device via the second communication system.

11. The mobile device communication adaption method of claim 10, wherein adapting the time of the communication comprises advancing or delaying a communication, adapting a repetition rate of the communication and/or increasing a data transfer rate of the communication.

12. A non-transitory computer readable medium including program code for performing, by a mobile device, a method for adapting communication by the mobile device to reduce interference between communication of the mobile device via a first mobile communication system and communication of the mobile device via a second mobile communication system when the program code is executed on a computer, in a processor, in a control module or in a programmable hardware component of the mobile device, the method comprising:
the mobile device receiving information about a location of one or more transmitters of the first mobile communication system and information about a used communication resource of the one or more transmitters of the first mobile communication system;
the mobile device determining a position of the mobile device based on the information about the location of the one or more transmitters of the first mobile communication system; and
the mobile device adapting the communication of the mobile device via the second mobile communication system based on the determined position of the mobile device based on the information about the location of the one or more transmitters of the first mobile communication system by adapting a usage of a communication resource of the second mobile communication system based on the information about the used communication resource of the one or more transmitters of the first mobile communication system.

13. The non-transitory computer readable medium of claim 12, wherein the used communication resource of the first mobile communication system and/or the communication resource of the second mobile communication system comprises at least one element from the group comprising frequency resource, time resource and spatial resource.

14. The non-transitory computer readable medium of claim 12, wherein the mobile device adapting the usage of the communication resource of the second mobile communication system comprises changing usage of the communication resource, or maintaining the communication resource of the second mobile communication system using modified communication parameters.

15. The non-transitory computer readable medium of claim 12, wherein the used communication resource of the first mobile communication system comprises a first frequency resource, and the communication resource of the second mobile communication system comprises a second frequency resource,
wherein there is at least a partial overlap between the first frequency resource and the second frequency resource, or
a frequency spacing between the first frequency resource and the second frequency resource is less than a frequency spacing threshold value.

16. The non-transitory computer readable medium of claim 12, wherein the mobile device adapting the communication comprises using, for the communication via the second mobile communication system, a frequency resource that, at the determined position of the mobile device, is not used by the one or more transmitters of the first mobile communication system.

17. The non-transitory computer readable medium of claim 12, wherein a frequency resource of the used communication resource of the first mobile communication system and/or a frequency resource of the communication resource of the second mobile communication system lies at least partially in a frequency range between 5 GHz and 6 GHz, and/or wherein adapting the communication also comprises adapting a handover of the mobile device between base stations of the second mobile communication system.

18. The non-transitory computer readable medium of claim 12, wherein the information about the location of the one or more transmitters of the first mobile communication system and the information about the used communication resource is contained in a map, and wherein the receiving, by the mobile device, of the information about the location of the one or more transmitters of the first mobile communication system and the information about the used communication resource comprises receiving at least part of the map by the mobile device.

19. The non-transitory computer readable medium of claim 12, wherein the mobile device adapting the communication is based on at least one element from the group comprising frequency multiplexing techniques, time multiplexing techniques and spatial multiplexing techniques.

20. The non-transitory computer readable medium of claim 12, wherein the mobile device adapting the communication via the second communication system comprises adapting a time of the communication by the mobile device via the second communication system.

21. The non-transitory computer readable medium of claim 20, wherein the adapting the communication additionally comprises adapting a digital modulation of the communication of the mobile device via the second mobile communication system or increasing a transmit power of the mobile device for the communication of the mobile device via the second mobile communication system.

22. A mobile device that adapts its communication to reduce interference between a first mobile communication system and its communication via a second mobile communication system, the mobile device comprising:
at least one interface to:
receive information about a location of one or more transmitters of the first mobile communication system and information about a used communication resource of the one or more transmitters of the first mobile communication system; and receive information about a position of the mobile device based on the information about the location of the one or more transmitters of the first mobile communication system from a positioning module of the mobile device; and a control module to:
control the at least one interface;
determine a position of the mobile device based on the information about the position of the mobile device; and
adapt communication of the mobile device via the second mobile communication system based on the position of the mobile device based on the information about the location of the one or more transmitters of the first mobile communication system by adapting a usage of a communication resource of the second mobile communication system based on the information about the used communication resource of the one or more transmitters of the first mobile communication system.

23. A transportation vehicle comprising the device of claim 22 for adapting communication of the transportation vehicle via the second mobile communication system.

24. The device of claim 22, wherein the used communication resource of the first mobile communication system and/or the communication resource of the second mobile communication system comprises at least one element from the group comprising frequency resource, time resource and spatial resource.

25. The device of claim 22, wherein the mobile device adaptation of the usage of the communication resource of the second communication system comprises changing, by the mobile device, usage of the communication resource of the second communication system, or maintaining usage, by the mobile device, of the communication resource of the second communication system using modified communication parameters.

26. The device of claim 22, wherein the used communication resource of the first communication system comprises a first frequency resource, and the communication resource of the second mobile communication system comprises a second frequency resource, wherein there is at least a partial overlap between the first frequency resource and the second frequency resource, or a frequency spacing between the first frequency resource and the second frequency resource is less than a frequency spacing threshold value.

27. The device of claim 22, wherein the mobile device adaption of the communication via the second communication system comprises using, for the communication via the second mobile communication system, a frequency resource that, at the determined position of the mobile device, is not used by the one or more transmitters of the first mobile communication system.

28. The device of claim 22, wherein the mobile device adapting the communication via the second communication system comprises adapting a time of the communication by the mobile device via the second communication system.

29. The device of claim 28, wherein adapting the time of the communication comprises advancing or delaying a communication, adapting a repetition rate of the communication and/or increasing a data transfer rate of the communication.

30. The device of claim 22, wherein the adaptation of the communication additionally comprises adaptation of a digital modulation of the communication of the mobile device via the second mobile communication system or increasing a transmit power of the mobile device for the communication of the mobile device via the second mobile communication system.

31. The device of claim 22, wherein a frequency resource of the used communication resource of the first communication system and/or a frequency resource of the communication resource of the second mobile communication system lies at least partially in a frequency range between 5 GHz and 6 GHz, and/or wherein adapting the communication by the mobile device also comprises adapting a handover of the mobile device between base stations of the second mobile communication system.

* * * * *